(12) United States Patent
Hofer et al.

(10) Patent No.: US 9,950,595 B2
(45) Date of Patent: Apr. 24, 2018

(54) VEHICLE DOOR

(71) Applicant: MAGNA STEYR Fahrzeugtechnik AG & Co KG, Graz (AT)

(72) Inventors: Bernhard Hofer, Graz (AT); Wolfgang Passegger, Tillmitsch (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 0 days.

(21) Appl. No.: 14/861,638

(22) Filed: Sep. 22, 2015

(65) Prior Publication Data

US 2016/0082813 A1 Mar. 24, 2016

(30) Foreign Application Priority Data

Sep. 24, 2014 (EP) ..................................... 14186196

(51) Int. Cl.
*B60J 5/04* (2006.01)

(52) U.S. Cl.
CPC ........... *B60J 5/0463* (2013.01); *B60J 5/0401* (2013.01); *B60J 5/0413* (2013.01); *B60J 5/0415* (2013.01); *B60J 5/0426* (2013.01); *B60J 5/0444* (2013.01); *B60J 5/0468* (2013.01); *B60J 5/0481* (2013.01)

(58) Field of Classification Search
CPC ...... B60J 5/0463; B60J 5/0468; B60J 5/0469; B60J 5/0481; B60J 5/0401; B60J 5/0426; B60J 5/0444
See application file for complete search history.

(56) References Cited

U.S. PATENT DOCUMENTS

| 5,050,351 | A | * | 9/1991 | Goldbach | B60J 5/0469 |
| | | | | | 296/146.7 |
| 5,152,037 | A | * | 10/1992 | Schiek | A44L 318/00 |
| | | | | | 24/306 |
| 5,167,553 | A | * | 12/1992 | Wilson | B63B 35/7936 |
| | | | | | 114/39.19 |
| 5,482,343 | A | | 1/1996 | Bradac | |
| 5,855,094 | A | * | 1/1999 | Baudisch | B60J 5/0412 |
| | | | | | 49/348 |
| 5,964,063 | A | * | 10/1999 | Hisano | B60J 1/17 |
| | | | | | 49/352 |

(Continued)

FOREIGN PATENT DOCUMENTS

| EP | 0257608 A2 | 3/1988 |
| FR | 3000702 A1 | 7/2014 |
| WO | 01/32456 A2 | 5/2001 |

OTHER PUBLICATIONS

Office Action for Chinese Patent Application No. 2015105904204, dated Dec. 11, 2017, 9 pages including 5 pages of English translation.

*Primary Examiner* — Jerry E Redman
*Assistant Examiner* — Catherine A Kelly
(74) *Attorney, Agent, or Firm* — Jordan IP Law, LLC; Todd A. Vaughn (57) ABSTRACT

A door for a motor vehicle that includes at least one thermoformed panel part, a supporting structure to support the panel part, and a holder fastened to the panel part. The holder is to engage in a shaped portion of the supporting structure or in a support element fastened to the supporting structure, so that the panel part may slide on the shaped portion and/or the support element in a direction perpendicular to the direction of engagement.

11 Claims, 6 Drawing Sheets

(56) References Cited

U.S. PATENT DOCUMENTS

| | | | | | |
|---|---|---|---|---|---|
| 5,987,821 | A | * | 11/1999 | Heim | B60J 5/0402 296/146.5 |
| 6,086,139 | A | * | 7/2000 | Heim | B60J 5/0405 296/146.5 |
| 6,123,385 | A | * | 9/2000 | Bailey | B60J 5/0416 296/146.7 |
| 6,381,906 | B1 | * | 5/2002 | Pacella | B60J 5/0416 296/146.5 |
| 6,390,533 | B1 | * | 5/2002 | Furuse | B60J 5/0425 296/146.5 |
| 7,003,881 | B2 | * | 2/2006 | Galliani | B60J 5/0463 29/458 |
| 7,111,894 | B2 | * | 9/2006 | Kora | B60J 5/0416 296/146.1 |
| 7,866,730 | B2 | * | 1/2011 | Lewis | B29C 51/267 296/146.5 |
| 8,316,593 | B2 | * | 11/2012 | Smith | F24J 2/045 136/244 |
| 8,944,488 | B2 | * | 2/2015 | Schidan | B60J 5/0408 296/146.7 |
| 9,010,840 | B2 | * | 4/2015 | Brymerski | B60J 5/0415 296/146.6 |
| 2002/0073627 | A1 | * | 6/2002 | Hock | B60J 5/0406 49/502 |
| 2009/0008959 | A1 | * | 1/2009 | Rehn | B60J 5/0405 296/146.7 |
| 2014/0361576 | A1 | * | 12/2014 | Storgato | B60J 5/0416 296/146.6 |

* cited by examiner

VEHICLE DOOR

CROSS-REFERENCE TO RELATED APPLICATIONS

The present application claims priority 35 U.S.C. § 119 to European Patent Publication No. EP14186196.3 (filed on Sep. 24, 2014), which is hereby incorporated by reference in its entirety.

TECHNICAL FIELD

Embodiments relate to a vehicle door for a motor vehicle having at least one thermoformed panel part and a supporting structure as a support for the panel part.

BACKGROUND

A construction of vehicle doors by way of panel parts, in particular an inner panel and an outer panel, wherein the panel parts are releasably or unreleasably fastened to a supporting structure, has been known for many years.

German Patent Publication No. DE 102 55 985 A1 discloses a device for connecting the outer panel to the supporting structure of a vehicle door with a support element unreleasably connected to the outer panel and releasably connected to the supporting structure. The support element is connected via a screw connection to the supporting structure of the vehicle door.

In such conventional fastening methods, the panel parts are connected to the supporting structure via a plurality of fixed fastening points, in particular screw connections. This is a drawback as the thermal expansion of the panel parts may be different from the thermal expansion of the supporting structure.

Generally, injection-moulded parts are used as panel parts, as said injection-moulded parts permit good deformability of the panel parts. This technology is cost-intensive, however, primarily for smaller quantities.

The production of components by way of thermoforming generally permits easier production, in particular with smaller quantities, but the options during the forming process are more limited so that, for example, it is not possible to create undercuts of the formed components.

SUMMARY

Embodiments relate to a vehicle door which may be produced cost-effectively and at the same time permit variable thermal expansion between a panel part and a supporting structure.

In accordance with embodiments, a vehicle door for a motor vehicle comprises at least one of the following: at least one thermoformed panel part; a supporting structure as a support for the panel part; a holder fastened to the panel part so as to engage in a shaped portion of the supporting structure or in a support element fastened to the supporting structure, so that the panel part may slide on the shaped portion and/or the support element in a direction perpendicular to the direction of engagement.

In accordance with embodiments, a panel part is produced by thermoforming. The shaping of undercuts, bent-back portions and similar retaining structures on the panel component is consequently only very limited and, depending on the shape, even not possible at all. In accordance with embodiments, therefore, a holder is fastened as an additional component to the panel part. The holder is configured such that in engagement with a supporting structure of the vehicle door, the panel part may slide along a shaped portion of the supporting structure itself or a support element fastened to the supporting structure in a direction perpendicular to the direction of engagement. The engagement corresponds, therefore, to an introduction and/or suspension of the holder in the shaped portion and/or the support element, in which a freedom of movement of the panel part is present in the direction perpendicular to the suspension. By the capacity of the two components to slide relative to one another, the variable thermal expansion of the components may be taken up. The shaped portion and/or the support element serves for guiding and approximate positioning of the holder and/or the panel part.

In accordance with embodiments, the engagement in a shaped portion of the support structure itself or a support element fastened to the supporting structure may also encompass that a plurality of fastened support elements of the supporting structure or different shaped portions and also fastened support elements together with shaped portions of the supporting structure itself, in particular by intermediate spaces formed thereby, may be used as mating elements for the engagement of the holder.

In accordance with embodiments, the holder is suspended from above in the shaped portion of the supporting structure or in the support element fastened to the supporting structure, so that the panel part may slide on the shaped portion and/or the support element in the longitudinal direction of the vehicle door.

In accordance with embodiments, the holder is formed by a retaining strip extending in the longitudinal direction of the vehicle and/or the shaped portion and/or the support element extends in the longitudinal direction of the vehicle.

In accordance with embodiments, the holder is located in an upper region of the panel part, in particular in the vicinity of the upper edge of the panel part. The holder substantially has a reversed U-shaped profile. The holder is fastened to the panel part by way of adhesive bonding or welding, in particular ultrasonic welding.

In accordance with embodiments, in addition to the fastening by way of the holder, the panel part may be fixed in the lower region of the panel part to the supporting structure, in particular, adhesively bonded and/or fastened by way of a clip connection or dual-lock connection to the supporting structure. Such an additional fastening may, in particular, be provided for an inner panel. The adhesive may in this case be a resilient mounting adhesive, which may also take up variations in thermal expansion to a limited degree. Particularly advantageous is a releasable connection by way of dual-lock connections known from the company 3M®, as in this case a less accurate alignment of the two components relative to one another is required than, for example, in simple clip connections.

In accordance with embodiments, the panel part, at least in the region of a first side of the holder, such as to the rear in the vehicle longitudinal direction, may have a guide tab extending in the vehicle longitudinal direction which is guided in a tab receiver of the supporting structure. Such a guide tab may slide in the vehicle longitudinal direction in the tab receiver and thus also take up the variable expansion behaviour of the components. Such a guide tab may be provided, in particular, on an outer panel.

In accordance with embodiments, an outer panel may be screwed in the region of a second side of the holder, such as at the front in the vehicle longitudinal direction, to the supporting structure and/or to a further connecting part with the supporting structure, and thus serves for positioning and anti-theft protection. Also, an inner panel may additionally be screwed to the supporting structure, wherein a single screw is used, as the actual fastening is substantially achieved by the holder according to the invention and the screw may simply serve for anti-theft protection and centring during mounting.

In accordance with embodiments, the vehicle door comprises an inner panel and an outer panel which are both designed as panel parts as described, and in particular both have at least one holder for fastening to the supporting structure.

In accordance with embodiments, the outer panel is fastened in the lower region to the inner panel, in particular adhesively bonded and/or connected by way of a clip connection or dual-lock connection. A fastening in the lower region of the outer panel to the supporting structure in this case does not take place as the thermal expansion of the outer panel may be markedly different from the supporting structure. Moreover, the outer panel in both side regions is fastened to the inner panel, in particular adhesively bonded and/or connected by way of a clip connection or dual-lock connection. A fastening in the side regions of the outer panel to the supporting structure also does not take place in this case.

In accordance with embodiments, apart from the plug connection by way of the holder, the outer panel is not fastened to the supporting structure, in particular, not adhesively bonded or screwed, but simply adhesively bonded to the inner panel part or fastened by way of dual-lock connections.

In accordance with embodiments, at least one, or a plurality of spacers may be arranged between the outer panel and the inner panel and/or between the outer panel and the supporting structure and/or between the inner panel and the supporting structure so that when loaded from outside the panel is not pressed in.

DRAWINGS

Embodiments will be illustrated by way of example in the drawings and explained in the description below.

DESCRIPTION

Figure 1:
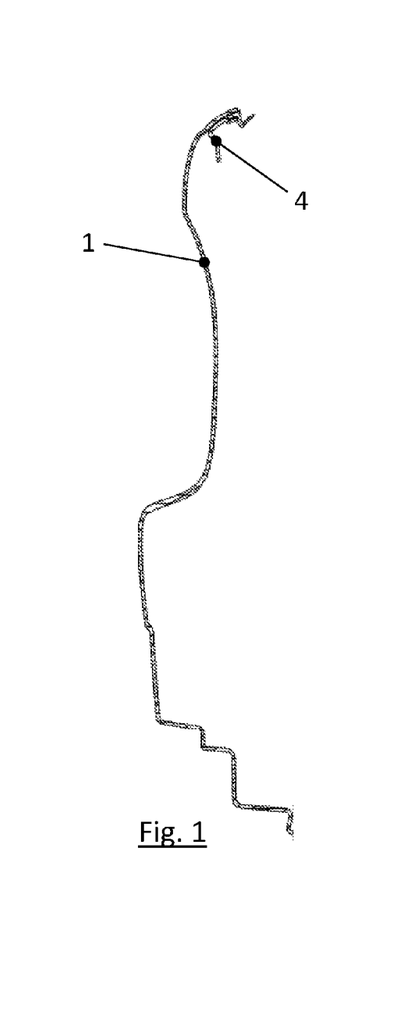
FIG. 1 illustrates a sectional view of an inner panel of a vehicle door, in accordance with embodiments.
Figure 2:
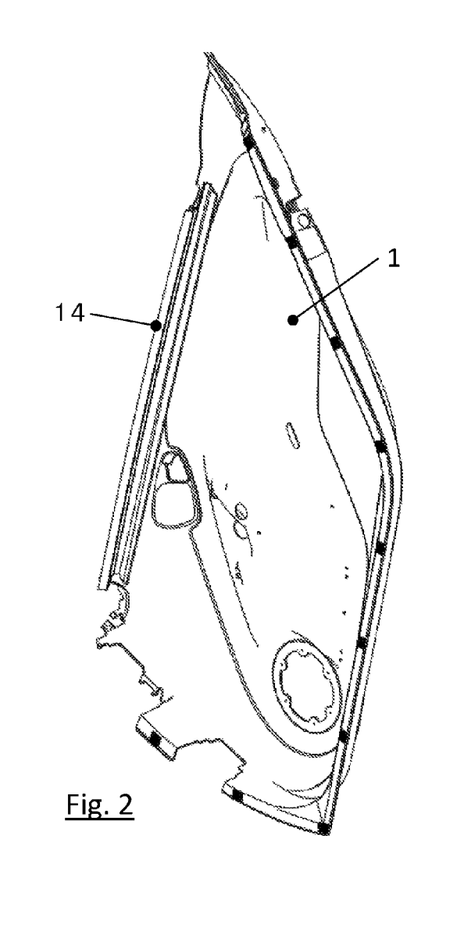
FIG. 2 illustrates a perspective view of an inner panel of a vehicle door, in accordance with embodiments.

FIG. 1 is a sectional view and in FIG. 2 a perspective view of an inner panel 1 of a vehicle door in accordance with embodiments. The inner panel 1 has a holder 4 in an upper region thereof in an installed position of the vehicle door.

Figure 3:
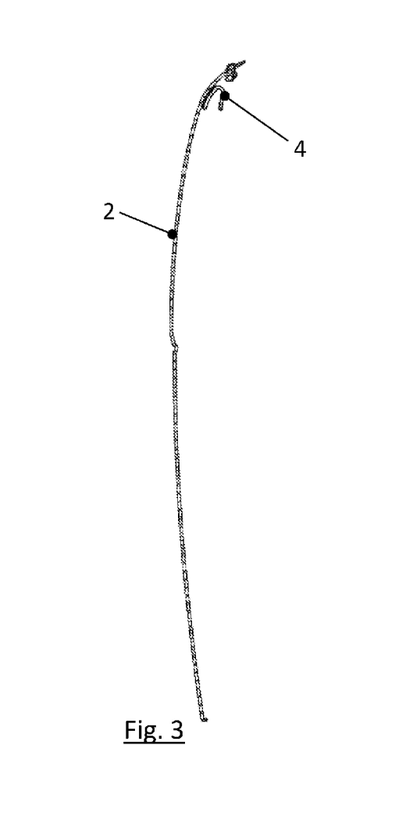
FIG. 3 illustrates a sectional view of an outer panel of a vehicle door, in accordance with embodiments.
Figure 4:
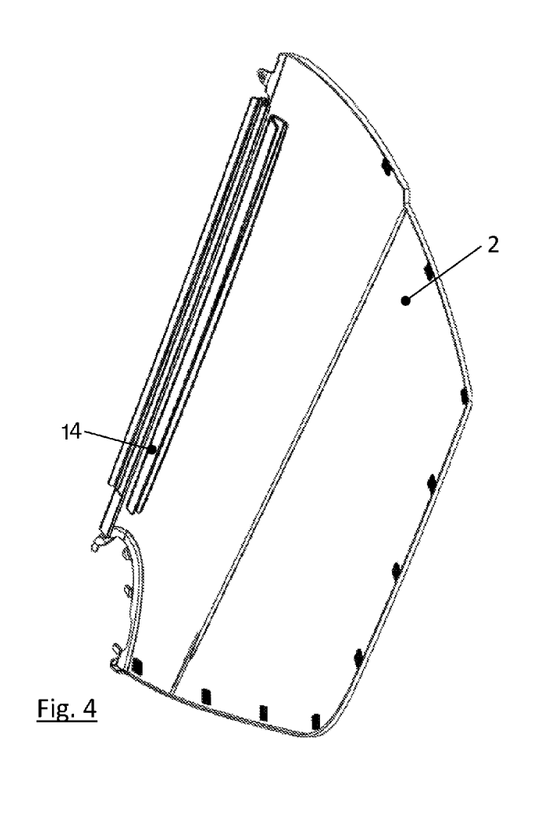
FIG. 4 illustrates a three-dimensional view of an outer panel of a vehicle door, in accordance with embodiments.

In a similar manner, FIGS. 3 and 4 illustrate a sectional view and a perspective view of an outer panel 2 of a vehicle door in accordance with embodiments. The outer panel 2 also has a holder 14 in an upper region thereof in an installed position of the vehicle door. The holder 14 substantially has a reversed U-shaped profile or cross-section.

Figure 5:
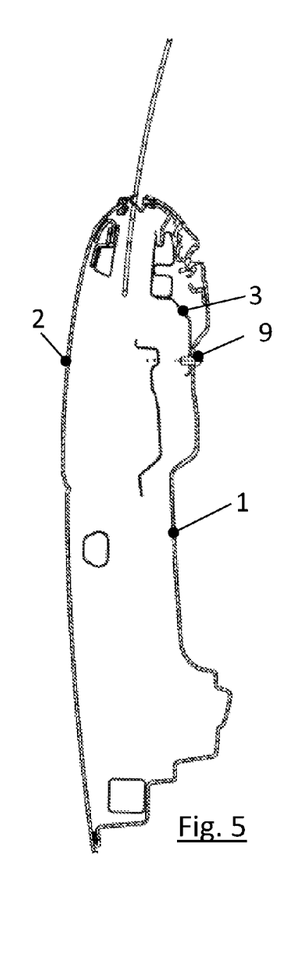
FIG. 5 illustrates a sectional view of a vehicle door, in accordance with embodiments.

FIG. 5 illustrates a sectional view of a complete vehicle door comprising an inner panel 1 and an outer panel 2, in accordance with embodiments. The upper region of the vehicle door is illustrated in more detail in FIG. 6, the lower region in FIG. 7. In a central region of the vehicle door the inner panel 1 is connected by a screw 9 to the supporting structure 3 of the vehicle door. The screw 9 serves primarily for spatially centering the inner panel 1 to the supporting structure 4.

Figure 6:
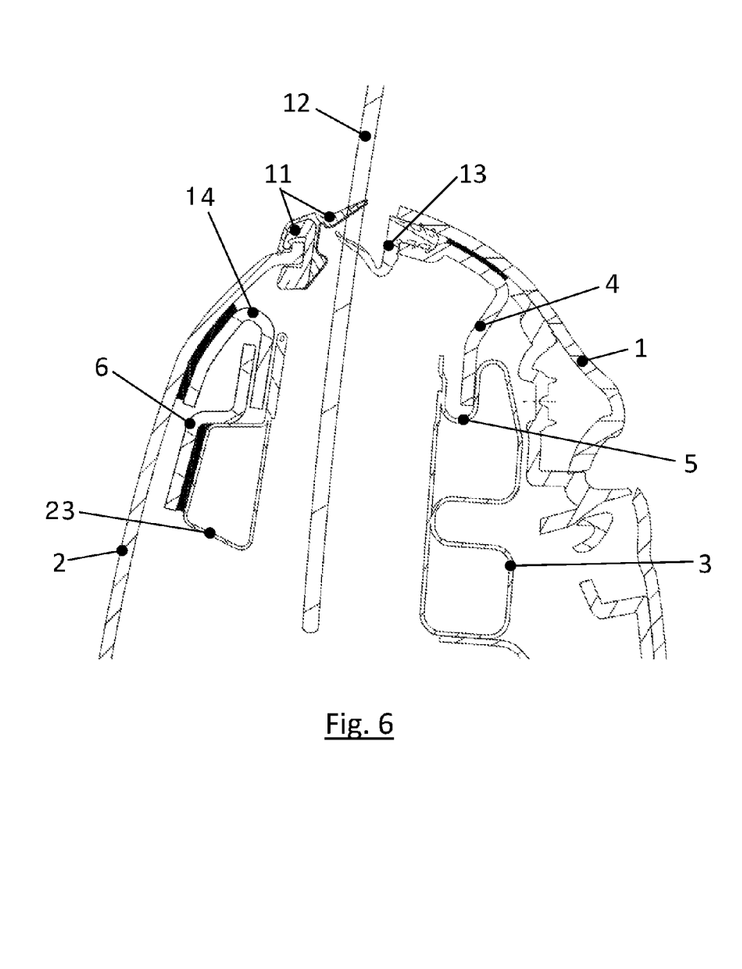
FIG. 6 illustrates a detailed view of the upper region of the vehicle door of FIG. 5.

FIG. 6 illustrates the fastening of the inner panel 1 and the outer panel 2 in each case by way of a respective holder 4, 14, fastened to the panel parts 1, 2, to the supporting structure 3, 23 of the vehicle door. On the outer panel 2, a U-shaped outer panel holder 14 is fastened by adhesive bonding. The adhesive is shown as a thick black line. The outer panel holder 14 engages in a support element 6 and/or in an intermediate space between the support element 6 and the supporting structure 23, and/or in this manner is suspended from above in the intermediate space. The upper end of the outer panel 2 opens into a groove of a window seal 11 for sealing relative to a window pane 12. The inner panel 1 also has an inner panel holder 4 which is bonded thereto and which in this case engages in a shaped portion 5 of the supporting structure 3. A seal 13 is arranged between the upper end of the holder 4 and the upper end of the inner panel 1 in order to seal the adhesive gap between the inner panel 1 and the inner panel holder 4. The inner panel holder 4 in this case is also configured for receiving a seal.

Figure 7:
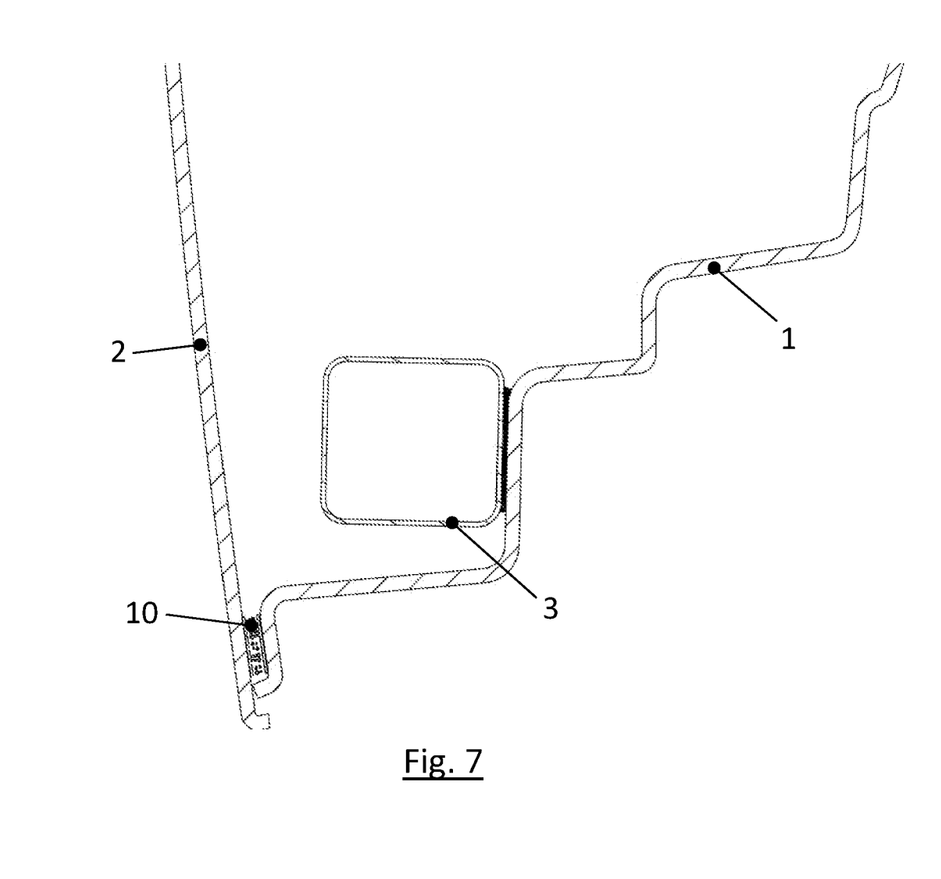
FIG. 7 illustrates a detailed view of the lower region of the vehicle door of FIG. 5.

FIG. 7 illustrates the lower region of the vehicle door of FIG. 5. In this case the inner panel 1 is fastened by way of an adhesive connection (black line) to the supporting structure 3. At the lower end the inner panel 1 and the outer panel 2 are connected together by way of dual-lock connections 10. As a result, a particular advantage is revealed in that, since only the inner panel part 1 is fastened in the lower region to the supporting structure 3 (adhesive, dual lock connection) and the outer panel part 2 in this region is only connected to the inner panel part 1 (adhesively or by dual-lock connection), no distortion due to variable thermal expansion is able to occur between the outer panel part 2 and the supporting structure 3 generally composed of metal. The same applies if the outer panel part 2 is only connected to the inner panel part 1 at the side regions and not to the supporting structure 3.

Figure 8:
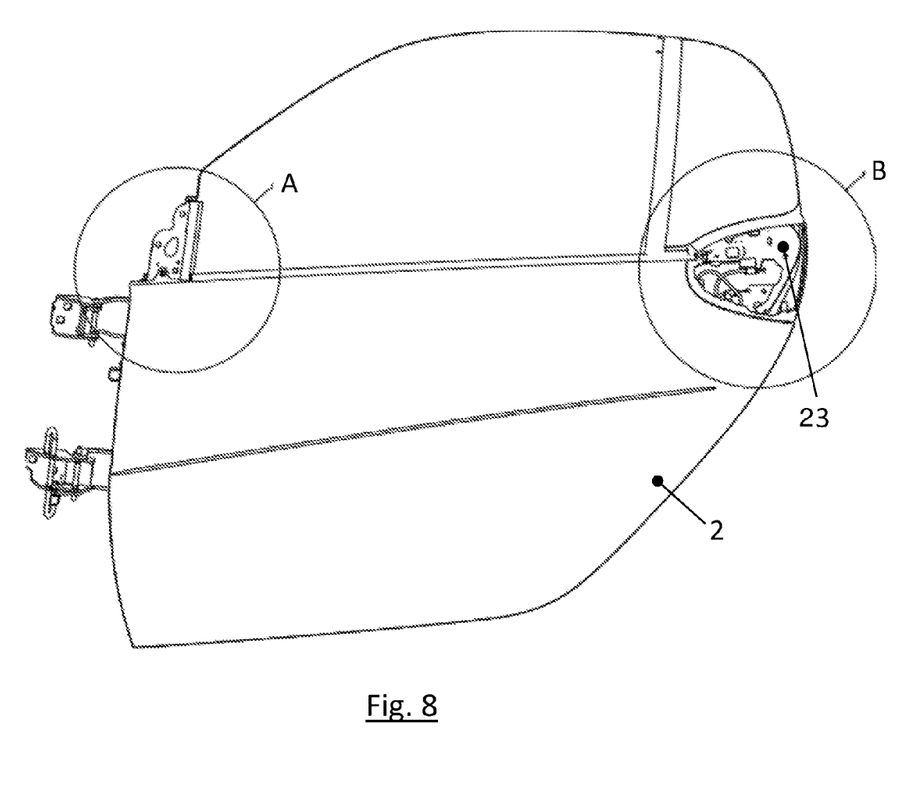
FIG. 8 illustrates a view of a mounted outer panel of a vehicle door with the detailed areas A and B, in accordance with embodiments.
Figure 9:
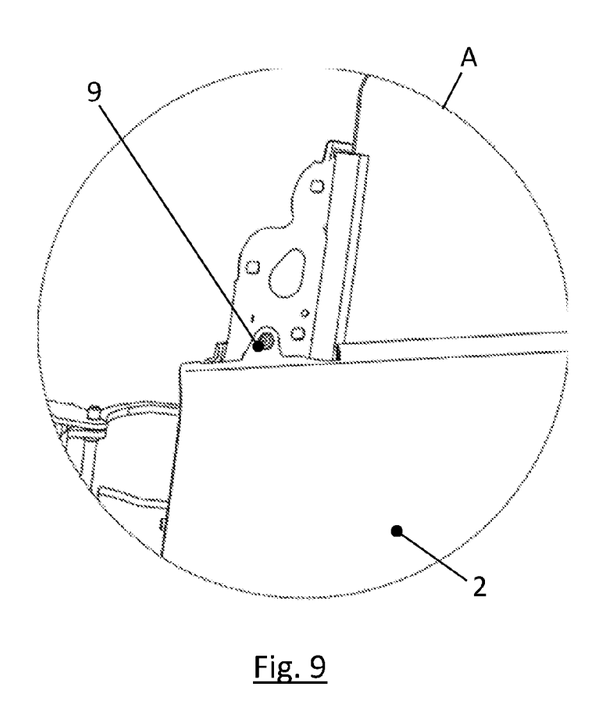
FIG. 9 illustrates a detailed view of the detailed area A of the vehicle door of FIG. 8.
Figure 10:
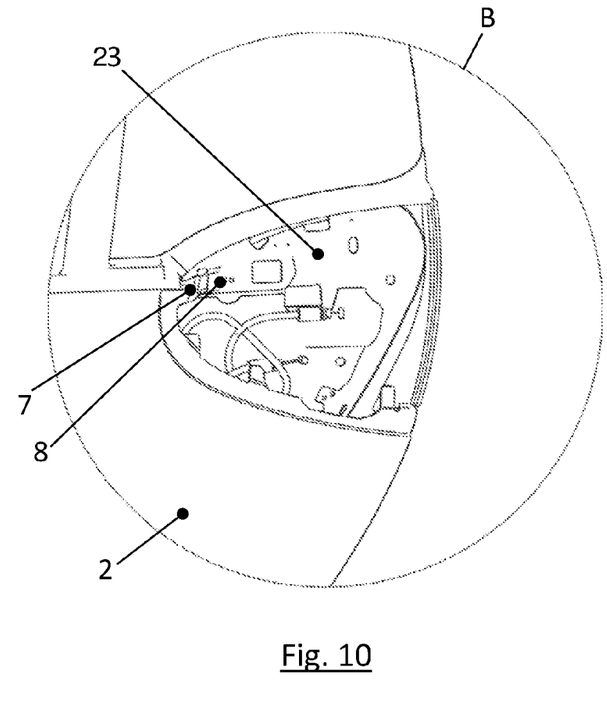
FIG. 10 illustrates a detailed view of the detailed area B of the vehicle door of FIG. 8.

FIG. 8 illustrates a mounted outer panel 2 of a vehicle door, in accordance with embodiments. At the front end of the vehicle door in the direction of the vehicle, in a detailed area A, illustrated in more detail in FIG. 9, the outer panel 2 is connected mechanically by way of a screw 9 to the supporting structure 23. In the area B to the rear in the vehicle direction, the outer panel 2 has a rearwardly protruding guide tab 7 which is introduced into a tab receiver 8 which is open to the front. As a result, the outer panel 2 is able to be subjected to thermal expansion in the vehicle longitudinal direction and at the same time the holder 4 is not able to lift up.

Additional Notes and Examples

Example one may include a door for a motor vehicle, comprising at least one panel part which is thermoformed; a supporting structure to support the panel part; and a holder fastened to the at least one panel part, and which engages in a portion of the supporting structure so that the at least one panel part may slide on the portion in a direction perpendicular with respect to a direction of engagement.

Example two may include the door of Example one, wherein the holder is suspended from above in the portion of the supporting structure so that the panel part may slide on the shaped portion in a direction longitudinal with respect to the vehicle door.

Example three may include the door of Example one, wherein the holder comprises a retaining strip extending in a direction longitudinal with respect to the vehicle door and/or the portion.

Example four may include the door of Example one, wherein the holder is located in an upper region of the at least one panel part.

Example five may include the door of Example one, wherein the holder has a reversed U-shaped profile.

Example six may include the door of Example one, wherein the holder is fastened to the panel part by one of adhesive bonding, or welding.

Example seven may include the door of Example one, wherein the at least one panel part comprises an inner panel, and in a lower region of the door, is fastened to the supporting structure by way of adhesive bonding and/or by way of a clip connection or dual-lock connection.

Example eight may include the door of Example one, wherein the at least one panel part comprises an outer panel, and at least in a region of a first side of the holder, has a guide tab extending in a longitudinal direction of the motor vehicle, and which is guided in a tab receiver of the supporting structure.

Example nine may include the door of Example one, wherein the at least one panel part comprises an outer panel, and is fastened to the supporting structure by way of a screw connection in a region of a second side of the holder.

Example ten may include the door of Example one, wherein the at least one panel comprises an inner panel and an outer panel.

Example eleven may include the door of Example ten, wherein the outer panel or the inner panel are fastened, in a lower region of the door respectively to the other panel part, by way of adhesive bonding and/or a clip connection or a dual-lock connection.

Example twelve may include the door of Example eleven, wherein in the lower region of the door, the outer panel or the inner panel is not fastened to the supporting structure.

Example thirteen may include the door of Example eleven, wherein in at least one side region, the outer panel or the inner panel is not fastened to the supporting structure.

Example fourteen may include the door of Example ten, further comprising at least one spacer arranged between the outer panel and the inner panel, and/or between the outer panel and the supporting structure, and/or between the inner panel and the supporting structure.

Example fifteen may include a door for a motor vehicle, comprising an inner panel; an outer panel; an inner panel supporting structure to support the inner panel; an outer panel supporting structure to support the outer panel; an inner panel holder fastened to the inner panel, and which engages in a portion of the inner panel supporting structure so that the inner panel may slide on the portion in a direction perpendicular to a direction of engagement; and an outer panel holder fastened to the outer panel, and which engages in a portion of the outer panel supporting structure so that the outer panel may slide on the portion in a direction perpendicular to a direction of engagement.

Example sixteen may include the door of Example fifteen, wherein in a lower region of the door, the inner panel is fastened to the inner panel supporting structure by way of adhesive bonding and/or by way of a clip connection or dual-lock connection.

Example seventeen may include the door of Example fifteen, wherein at least in a region of a first side of the outer panel holder, the outer panel has a guide tab extending in a longitudinal direction of the motor vehicle, and which is guided in a tab receiver of the outer panel supporting structure.

Example eighteen may include the door of Example fifteen, wherein the outer panel is fastened to the outer panel supporting structure by way of a screw connection in a region of a second side of the outer panel holder.

Example nineteen may include the door of Example fifteen, wherein in a lower region of the door, the inner panel is fastened to the outer panel, and the outer panel is not fastened to the outer panel supporting structure.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Inner panel
2 Outer panel
3 Supporting structure
4 Inner panel holder
5 Shaped portion
6 Support element
7 Guide tab
8 Tab receiver
9 Screw
10 Dual-lock connection
11 Window seal
12 Window pane
13 Seal
23 Supporting structure
14 Outer panel holder

What is claimed is:
1. A door for a motor vehicle, comprising:
  a panel part, composed of a thermoformed material, including an inner panel and an outer panel;
  a supporting structure, composed of metal, including a first inner panel supporting structure, to support the inner panel at an upper region of the door, a second inner panel supporting structure, to support the inner panel at a lower region of the door, and an outer panel supporting structure, to support the outer panel at the upper region of the door;

an inner panel holder, fastened at one end thereof to the inner panel and received at an opposite end thereof in the first inner panel supporting structure, to thereby enable sliding of the inner panel relative to the first inner panel supporting structure in a longitudinal direction in an installed position of the door; and an outer panel holder fastened at one end thereof to the outer panel and received at an opposite end thereof in the outer panel supporting structure, to thereby enable sliding of the outer panel relative to the outer panel supporting structure in a longitudinal direction in an installed position of the door, wherein:
- at an upper region of the door, the inner panel is slideably connected to the inner panel supporting structure at a first connection region via the inner panel holder, and the outer panel is slideably connected to the outer panel supporting structure at a second connection region via the outer panel holder; and
- at a lower region of the door, the inner panel is connected at a third connection region to the outer panel by way of a directly engaged connection.

2. The door of claim 1, wherein, at least in a region of a first side of the outer panel holder, the outer panel has a guide tab extending in a longitudinal direction of the motor vehicle, and which is guided in a tab receiver of the outer panel supporting structure.

3. The door of claim 2, wherein the outer panel is connected to the outer panel supporting structure by way of a screw connection in a region of a second side of the outer panel holder.

4. The door of claim 1, wherein, in the lower region of the door, only the inner panel is connected to the supporting structure, and the outer panel is only connected to the inner panel.

5. A door for a motor vehicle, comprising:
- an inner panel composed of a thermoformed material;
- an outer panel composed of a thermoformed material;
- a supporting structure, composed of metal, including an inner panel supporting structure and an outer panel supporting structure;
- an inner panel holder, fastened at one end thereof to the thermoformed inner panel and received at an opposite end thereof in the inner panel supporting structure, to thereby enable sliding of the inner panel relative to the inner panel supporting structure in a longitudinal direction in an installed position of the door; and
- an outer panel holder fastened at one end thereof to the outer panel and received at an opposite end thereof in the outer panel supporting structure, to thereby enable sliding of the outer panel relative to the outer panel supporting structure in a longitudinal direction in an installed position of the door, wherein:
- at an upper region of the door, the inner panel is slideably connected to the inner panel supporting structure via the inner panel holder, and the outer panel is slideably connected to the outer panel supporting structure via the outer panel holder; and
- in a lower region of the door, the outer panel is connected only to the inner panel by way of a directly engaged connection.

6. The door of claim 5, wherein in the lower region of the door, the inner panel is connected to the inner panel supporting structure by way of adhesive bonding.

7. The door of claim 5, wherein in the lower region of the door, the inner panel is connected to the inner panel supporting structure by way of a clip connection.

8. The door of claim 5, wherein in the lower region of the door, the inner panel is connected to the inner panel supporting structure by way of a directly engaged connection.

9. The door of claim 5, wherein at least in a region of a first side of the outer panel holder, the outer panel has a guide tab extending in a longitudinal direction of the motor vehicle, and which is guided in a tab receiver of the outer panel supporting structure.

10. The door of claim 9, wherein the outer panel is fastened to the outer panel supporting structure by way of a screw connection in a region of a second side of the outer panel holder.

11. A door for a motor vehicle, comprising:
- a supporting structure, composed of metal, including a first inner panel supporting structure, a second inner panel supporting structure, and an outer panel supporting structure;
- an inner panel, composed of a thermoformed material, and an inner panel holder fastened at one end thereof to the inner panel and received at an opposite end thereof in the first inner panel supporting structure, to thereby enable sliding of the inner panel relative to the first inner panel supporting structure in a longitudinal direction in an installed position of the door;
- an outer panel, composed of a thermoformed material, and an outer panel holder fastened at one end thereof to the outer panel and received at an opposite end thereof in the outer panel supporting structure, to thereby enable sliding of the outer panel relative to the outer panel supporting structure in a longitudinal direction in an installed position of the door, wherein:
- at an upper region of the door, the thermoformed inner panel is slideably connected to the inner panel supporting structure via the inner panel holder, and the thermoformed outer panel is slideably connected to the outer panel supporting structure via the outer panel holder; and
- in a lower region of the door, the thermoformed outer panel is connected only to the thermoformed inner panel by way of a directly engaged connection.

* * * * *